INVENTOR
William Huber, Sr.
Diggins & LeBlanc
ATTORNEYS

INVENTOR
William Huber, Sr.
BY
Diggins & Le Blanc
ATTORNEYS

Jan. 12, 1960 W. HUBER, SR 2,921,295

MAGNETIC MEMORY DEVICE

Filed July 9, 1956 5 Sheets-Sheet 3

INVENTOR
William Huber, Sr.

Diggins & LeBlanc
ATTORNEYS

Jan. 12, 1960

W. HUBER, SR 2,921,295

MAGNETIC MEMORY DEVICE

Filed July 9, 1956

5 Sheets-Sheet 4

INVENTOR

William Huber, Sr

BY

Diggins & LeBlanc

ATTORNEYS

MAGNETIC MEMORY DEVICE

Filed July 9, 1956 5 Sheets-Sheet 5

INVENTOR
William Huber, Sr.

Diggins & LeBlanc
ATTORNEYS

United States Patent Office 2,921,295
Patented Jan. 12, 1960

2,921,295

MAGNETIC MEMORY DEVICE

William W. Huber, Sr., Canton, Ohio, assignor to United States Ceramic Tile Company, Canton, Ohio, a corporation of Ohio Application July 9, 1956, Serial No. 596,664

26 Claims. (Cl. 340—174)

This invention relates to a magnetic memory device and more particularly relates to a relatively simple and highly flexible magnetic memory device capable of performing a large variety of sorting and classifying functions in a reliable manner.

While a large number of memory devices suitable for use in classifying and sorting functions are currently available, most of these are designed specifically for the particular job at hand and are not suited to economical or easy adaptation to other jobs. Many of these devices are highly complex and expensive while others are susceptible to a particular type of wear which, in time, leads to errors in operation.

It is accordingly a primary object of the present invention to provide a magnetic memory device which is flexible, relatively simple and readily adapted to supplying a variety of needs.

It is another object of the invention to provide a magnetic memory device of the foregoing type wherein wear of moving parts is minimized and is of such a nature that it does not introduce errors in operation.

It is another object of the invention to provide a magnetic memory device of the foregoing type which may be rearranged to perform different jobs by personnel which are not particularly skilled with memory devices.

It is a further object of the invention to provide an improved magnetic memory device which is portable.

It is a further object of the invention to provide a magnetic memory device capable of being adapted to any sorting and classifying machine by synchronizing the memory device to the machine.

These and other objects and advantages of the invention will become apparent upon reference to the following specification and claims and appended drawings wherein:

Figure 1:
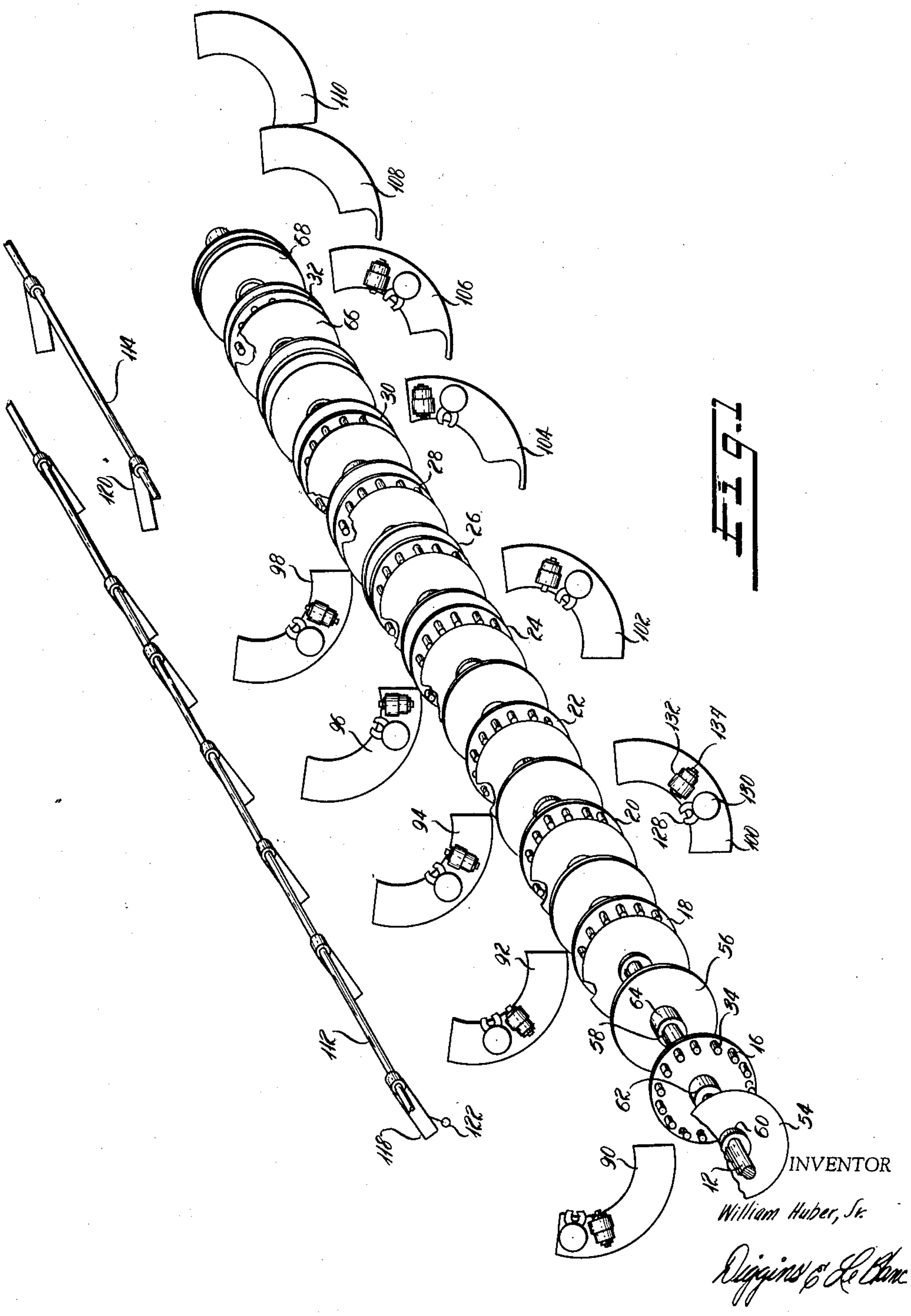
Figure 1 is an exploded perspective view of the rotor, magnet assemblies and switch actuating levers of a magnetic memory device constructed according to the invention.
Figures 2, 3, 4, 5, 11:
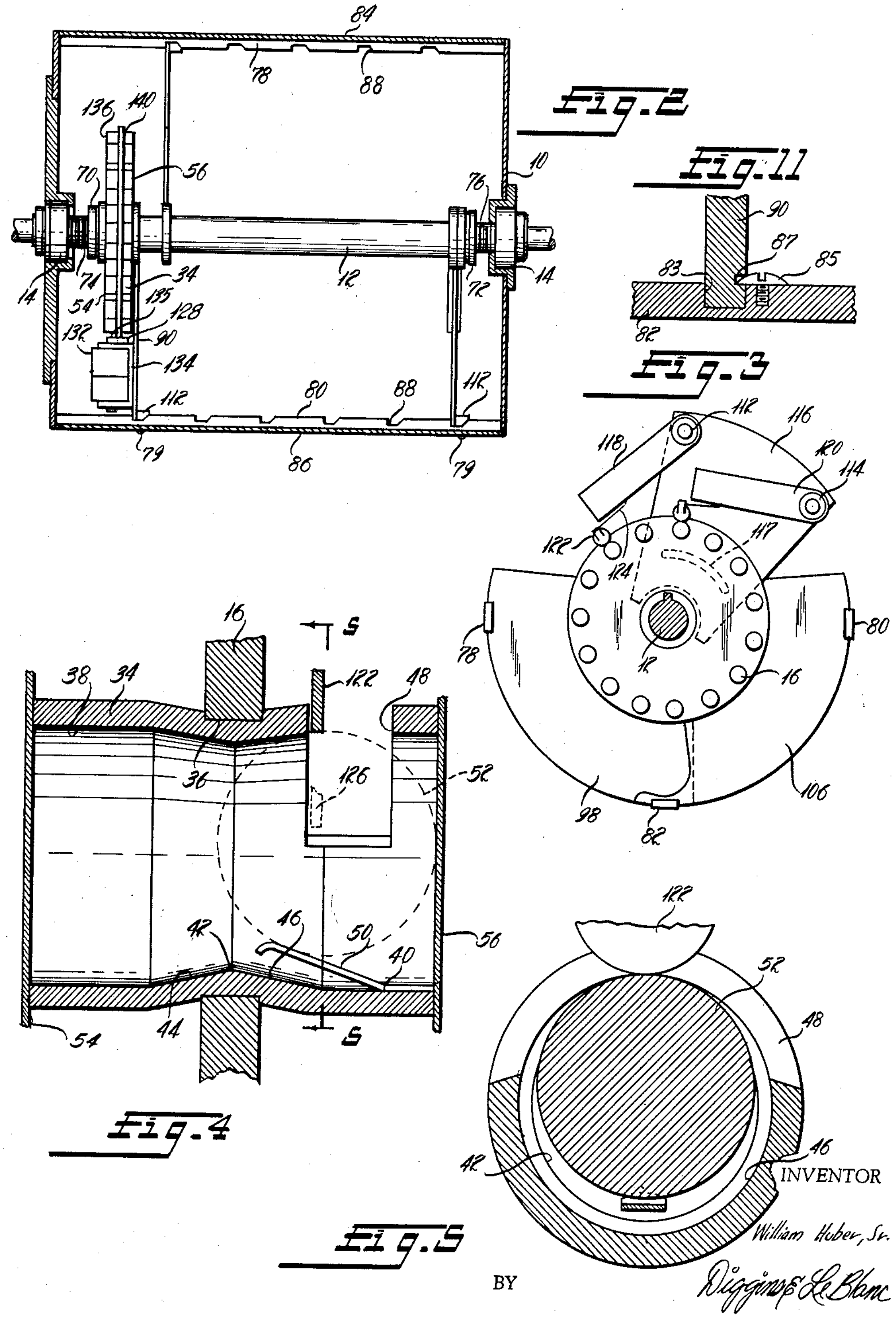
Figure 2 is a horizontal section of a magnetic memory device constructed according to the invention showing one disc.
Figure 3 is a vertical elevation of the rotor showing the shaft, one disc, the switch actuating levers and magnet mounting plates.
Figure 4 is a vertical elevation of a barrel.
Figure 5 is a vertical section of the barrel of Figure 4 taken on the line 5—5.
Figure 11 is a vertical section showing a feature of the mounting of the magnet plates.

Referring more particularly to Figures 1 and 2 there is seen in Figure 2 a cabinet 10 in which a shaft 12 is mounted in bearings 14. The shaft 12 carries a number of non-magnetic barrel plates 16–32 in which are mounted a number of barrels 34 which extend through the plates as is best seen in Figure 2. A barrel 34 is shown in detail in Figures 4 and 5 and consists of a non-magnetic cylinder which is inserted into an aperture 36 in barrel plate 16 and which is then swaged at either end so as to produce enlarged cylindrical end sections 38 and 40 which are separated by a constricted portion 42. The constricted portion 42 is formed by cone sections 44 and 46 which meet one another at the center plane of the barrel plate 16 and which meet the cylindrical sections 38 and 40. A slot 48 is provided in the cylindrical section 40 and a leaf spring 50 is secured to the inside of the barrel near the slotted end so as to force a ball 52 in the slotted end up toward the slot. The ball is of such a diameter that it can freely pass through the constricted portion 42 of the barrel and the leaf spring 50 permits its passage in either direction. While the leaf spring is shown in the illustrated embodiment of the invention its use is optional in that the ball is retained upon either side of the constriction 42 by the shape of the inside surface of the barrel.

A pair of non-magnetic cover plates 54 and 56 is provided for each side of each barrel plate to close the open ends of the barrels and restrain the balls from rolling out. The barrel plate 16 and cover plates 54 and 56 are all keyed to the shaft 12 by means of a key 58 and are retained in the desired axial alignment by means of collars 60, 62 and 64, as is best seen at the lower left end of Figure 1. While the shaft shown in Figure 1 is capable of accommodating 11 barrel plates or discs, the assemblage of a barrel plate, barrels, and cover plates being referred to as a disc, only nine discs are actually utilized, there being two blanks 66 and 68 in the assemblage. Eleven discs were not required for the particular application for which the assemblage of Figure 1 was prepared. The blanks 66 and 68 are mounted on the shaft merely for the purpose of giving the proper spacing to the other discs and to permit all discs to be assembled by means of lock nuts 70 and 72 which engage threaded portions 74 and 76 on the shaft 12, as is best seen in Figure 2.

Referring to Figures 2 and 3, three mounting bars 78, 80 and 82 are mounted approximately midway of the side walls 84 and 86 and the bottom wall of the cabinet 10 and extend longitudinally thereof. Each of these bars is provided with a plurality of notches 88 in which are mounted magnet holding plates 90–110, these plates being held in position by means of wedges 112 fastened to mounting bars 78 and 80 by screws 79 which are accessible from the outside of the cabinet. Mounting bar 82 is provided with notches 83, as shown in Figure 11, and the magnet holding plates 90–110 are fastened therein by means of screws 85 which fit into grooves 87. The grooves 87 are cut around the sides of the plates and the screws 85 prevent the plates from lifting and changing their radius location but permit the plates to be rotated. Each magnet mounting plate is secured to the bottom mounting bar 82 and to one of the side mounting bars 78 or 80 depending on which side of the shaft the mounting plate is mounted. A plurality of magnets may be mounted upon each magnet mounting plate for purposes hereinafter to become apparent and the magnets may be mounted so that their pole pieces are adjacent either side of the barrel by simply choosing the desired side of the mounting plate to which the magnet is attached. Holes are drilled in the plates 90–110 at the correct and proper spacing to allow magnets to be located in any desired position while in the field. The magnet holding plates may be adjusted by loosening the wedges 112 from the outside of the cabinet and simply rotating the plates. Screws 85 (Figure 11) prevent the plates from lifting or altering their radial location relative to shaft 12.

Figure 7:
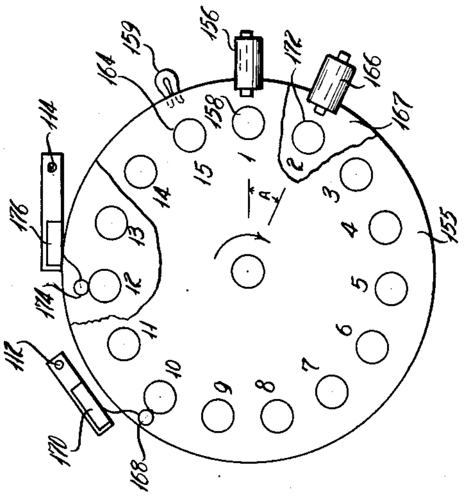
Figure 7 is an end view of a disc showing the position of the electromagnets.
Figure 8:
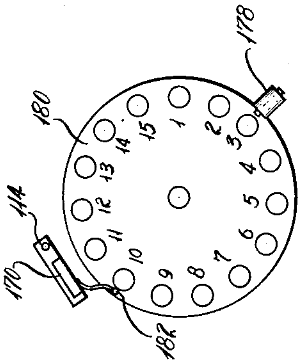
Figure 8 is an end view of another disc showing the position of the electromagnet.

A pair of switch support shafts 112 and 114 are mounted longitudinally within the cabinet 10 in a pair of brackets 116 bolted inside the cabinet ends, as best seen in Figure 3. Brackets 116 are bolted through arcuate slots 117 so as to permit easy radial adjustment of the support shafts 112 and 114. Each switch support shaft 112 and 114 carries a plurality of switch support arms 118 and 120 which are shown in detail in Figure 12. Referring to this figure the switch support arm 118 is rotatably mounted on support shaft 112 and carries a switch 170 having an actuating button 171. Switch 170 is fastened in position by means of screws 173 which pass through slots (not shown) in arm 118 and engage nuts (not shown). By loosening the screws the switch may be adjusted along arm 118 as the screws move along the slots. An actuating arm 124 is attached to switch 170 and carries a ball contacting wheel 122. Switch support arm 118 is maintained in position by means of a screw 123 passing through a struck out flange 125 to which a nut 127 is fixed. The other end of screw 123 is held in a flange 129 on a stationary bracket 131 which is secured to shaft 112 by collar 133 and set screw 135. Referring to Figures 4 and 5, the arms are so spaced upon the switch support shafts that the ball contacting wheels 122 pass through the slots 48 in the barrels. The switch support shafts 112 and 114 support switches 170 and 176 which are shown in Figures 7 and 8.

When the ball 52 in barrel 34 in Figure 4 is at the left end thereof and the slotted end of the barrel is empty, the ball contacting wheel 122 passes through the slot 48 in the broken line position 126 without being moved by the barrel. The slots 48 in all barrels face outward from the shaft 12. When the ball 52 is in the right end of the barrel 34, as shown in Figure 4, it forces the ball contacting wheel 122 outwardly to actuate the switch. It will be noted upon reference to Figure 4 that the wheel 122 is axially positioned to the left of the center of the ball 52 so that the pressure which it exerts upon the ball tends to keep the ball in the right side of the barrel rather than force it to the left unoccupied side. This is of considerable importance in lending reliability to the operation of the device since it prevents the ball from escaping from its intended position and thus prevents errors in sorting or classifying. The circular nature of the ball and the shape of the barrel in which it is retained minimizes wear since the ball tends to rotate and wear is distributed over substantially its entire surface. Even after wear occurs, however, the reliability of the device is not affected until the ball has been very substantially reduced in diameter, a happening which is for all practical purposes impossible within the normal life of the device.

Referring to Figures 1 and 2, it is seen that in this embodiment of the invention each magnet mounting plate 90–106 is provided with both a permanent magnet 128, mounted thereon by means of a magnet holder 130, and an electromagnet 132, mounted thereon in a bracket 134. Reference to Figure 2 will show that the electromagnet 132 on plate 90 has its pole piece 135 adjacent the left or slotted ends 136 of the barrels shown in Figure 2, while the permanent magnet 128 has its end adjacent the unslotted end 140 of the barrels shown in Figure 2. As a barrel passes by the permanent magnet a ball in the slotted end 136 of the barrel is attracted to the unslotted end and a ball which is already in the unslotted end remains therein. As a barrel passes the electromagnet 132 a ball in the unslotted end 140 of the barrel is attracted into the slotted end if the electromagnet is energized, but remains in the unslotted end if the electromagnet is not energized. The permanent magnet thus serves as a "clearing" device to "erase" any previous setting of the ball and to insure that it is in the unslotted end of the barrel prior to the time that the barrel passes the electromagne 132. The elecromagnet 132 thus serves to either leave the ball in the unslotted end of the barrel, sometimes hereinafter referred to as the unattracted position, or to attract the ball ino the slotted end of the barrel, sometimes hereinafter referred to as the attracted position.

Figures 6, 12:
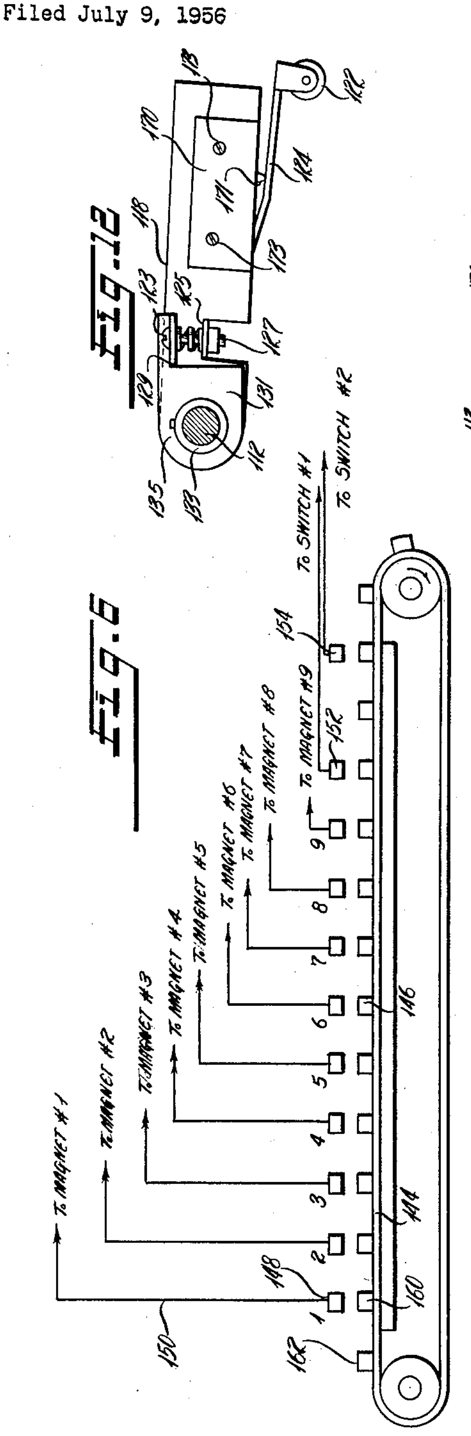
Figure 6 is a diagrammatic representation of a conveyor system showing the gauges and ejector mechanisms.
Figure 12 is an elevation showing the mounting of the switches.

The operation of the device is described in connection with a simple sorting problem illustrated diagrammatically in Figure 6. In that figure there is shown a conventional conveyor 144 to which a plurality of pieces to be sorted 146 are delivered at regular intervals. Assuming that it is desired to accept or reject these pieces depending upon whether or not they conform to nine different sets of tolerances, nine gaging devices 148 (numbered 1 through 9 in Figure 6) are provided at nine consecutive positions along the conveyor. While a belt type conveyor is shown at Figure 6, it will be realized that this is for purposes of illustration only and that any suitable gauging mechanism capable of determining in which of a number of groups of tolerances the object may fall. The gages 148 are of any conventional type suitable for measuring the desired variables and transposing the measurement into an electrical signal indicating whether or not the particular piece being gaged falls within the tolerances set up. The variables may be, as an example, the width, heigth, length, color, hardness, etc. of the pieces being classified, and the conveyor 144 may operate in a stepwise fashion to enable the various gaging operations to be carried on.

The signals from the gages 148 are connected by means of leads 150 to electromagnets associated with discs in the memory device and the shaft of the memory device is rotated synchronously with the movement of the pieces on the conveyor, so that a barrel advance occurs for each one station advance of the pieces on the conveyor. In this particular embodiment of the invention it is desired merely to allow all satisfactory pieces to pass completely across the conveyor and be delivered over the right end thereof and to eliminate pieces which fail to fall within tolerance by ejecting them into one of two bins depending upon the particular tolerances which they fail to satisfy. For this ejection purpose a pair of ejectors 152 and 154 are placed along the conveyor subsequent to the gaging stations and these may be of any suitable type for removing or pushing the pieces off of the conveyor and into a bin, chute or further conveyor.

Referring to Figure 7, which shows a disc 155 having 15 barrels thereon and which is marked to show 15 stations, an electromagnet 156 is mounted at station 1 adjacent the slotted end of a barrel 158. This is assumed to be a start position which occurs when a piece 160 is under the first gage 148. The electromagnet 156 is thus magnet 1 and is connected to gage 1 so that if this gage indicates that piece 160 is not within that particular tolerance a signal from this gage will energize magnet 156 and attract the ball in barrel 158 into the slotted end thereof. A permanent magnet 159 is mounted at station 15 with its pole pieces adjacent the unslotted end of the barrel to "clear" any previous settings of the balls and to insure that they are in the unslotted end of the barrel when it reaches station 1. The piece 160 then moves to station 2 beneath gage 2 and during this increment of movement all of the discs in the memory device rotate through an angle A to the next station. Gage 1 then gages the succeeding piece 162, which is now at station 1, and acts upon the ball in barrel 164 to place that ball in the slotted end of the barrel if the piece does not meet tolerances and to allow it to remain in the unslotted end of the barrel if the piece does meet tolerances.

Simultaneously with the gaging of the second piece 162 by gage 1 and simultaneously with barrel 164 being at position number 1 in Figure 7, gage 2 is gaging the original piece 160 and is transmitting its signal to an electromagnet 166 which is mounted at station 2 adjacent another disc 167 in the memory device. Confining our consideration at the present time to the actions of these two magnets, when the original piece 160 moves one station beyond gage 9, barrel 158 is at station 10 in Figure 7 beneath the ball engaging wheel 168. If, during the time that piece 160 was beneath gage 1, that gage indicated that the piece did not meet tolerances and thus attracted the ball in barrel 158 to the slotted end thereof, the ball, when at station 10, contacts wheel 168 and actuates switch 170 which is connected to ejector 152, thereby causing piece 160 to be removed from the conveyor and delivered into a suitable bin. After an advance of one more station piece 162 has arrived under ejector 152 and barrel 164 has arrived at position 10 so that the ball in barrel 164 determines whether or not piece 162 is to be ejected by ejector 152.

Assuming now the condition that piece 160 satisfied gage 1 and that the ball in barrel 158 was not attracted by a magnet 156, wheel 168 at position 10 in Figure 7 will not be actuated and ejector 152 will perform no ejecting function. Piece 160 then proceeds to the next station beyond ejector 152 at which position no action occurs and proceeds to a station beneath ejector 154 which corresponds to station 12 in Figure 7. At this station barrel 172 will have moved 10 stations from station 2 in Figure 7 to station 12 and will be beneath roller 174 which actuates switch 176 which is connected to ejector 154. Thus if gage 2 had indicated that piece 160 did not meet its present tolerances and had energized electromagnet 166 when barrel 172 was at position 2, the ball which was thus attracted will actuate wheel 174 and switch 176 to cause ejection of piece 160 by ejector 154. Thus the piece being gaged by gages 1 and 2 will be ejected by ejector 152 and 154 respectively depending upon whether the piece fails to meet the tolerance of gage 1 or of gage 2. In this embodiment of the invention the piece is ejected by ejector 152 if it fails to meet the tolerance of gage 1 regardless of whether it meets or fails to meet the tolerance of gage 2. If the piece meets the tolerance of both gages neither ejector is actuated and the piece simply falls off the right end of the conveyor 144. In this particular embodiment all pieces are separated into a class ejected by ejector 152, a class ejected by ejector 154, and a class which is satisfactory and passes off the end of the conveyor.

The remaining gages 3 through 9 are connected to actuate either ejector 152 or 154. If it is desired that gage 3 actuate ejector 152 an electromagnet 178 is placed at position 3 adjacent a disc 180, as shown in Figure 8, and a ball contacting wheel 182 is provided at position 10 actuating the same switch 170 that is actuated by wheel 168 in Figure 7. If it were to be desired that those pieces failing to satisfy gage 3 be ejected by ejector 154, no ball contacting wheel would be placed at position 10 in Figure 8, but would instead be placed at position 12 to actuate switch 176 which is actuated by ball contacting wheel 174 in Figure 7. One magnet is placed at each station 1 through 9 as shown in Figures 7 and 8 adjacent separate discs and ball contacting wheels are associated with each disc and actuate shaft 184 or 186 depending upon whether it is desired to actuate ejector 152 or 154. All gages simultaneously gage pieces for their respective tolerances and the information as to whether or not the particular piece conforms or does not conform to the particular tolerance is stored by the memory device until the piece arrives under the ejector which the particular gage is set to actuate. The information is then removed from the memory device to actuate the ejector and eject the piece if it does not meet tolerances.

Referring to Figure 7 there is shown a plate 155 having 15 barrels thereon. The reason for using two support shafts 112 and 114 is to be able to use more positions on the barrel plate. If identification occurs at position 9 and rotation is clockwise, switch 170 would contact one station later. If identification occurs at position 15 switch 170 on shaft 112 would operate ten stations later; but since shaft 114 is available it is possible to use twelve plates and by identifying at position 10 and using the switch on shaft 114, it is possible to operate twelve stations later. By rotating plate 106 counter clockwise, we can place the magnet which was at station 15 at station 14 and by identifying these can use thirteen plates and operate thirteen stations later. Some operations may not permit an ejection one station later. In this case it would be possible to rotate bracket 116 clockwise to any desired position, but in this case, the number of plates used or ejections is diminished from the maximum of thirteen possible on a fifteen barrel plate.

Figure 9:
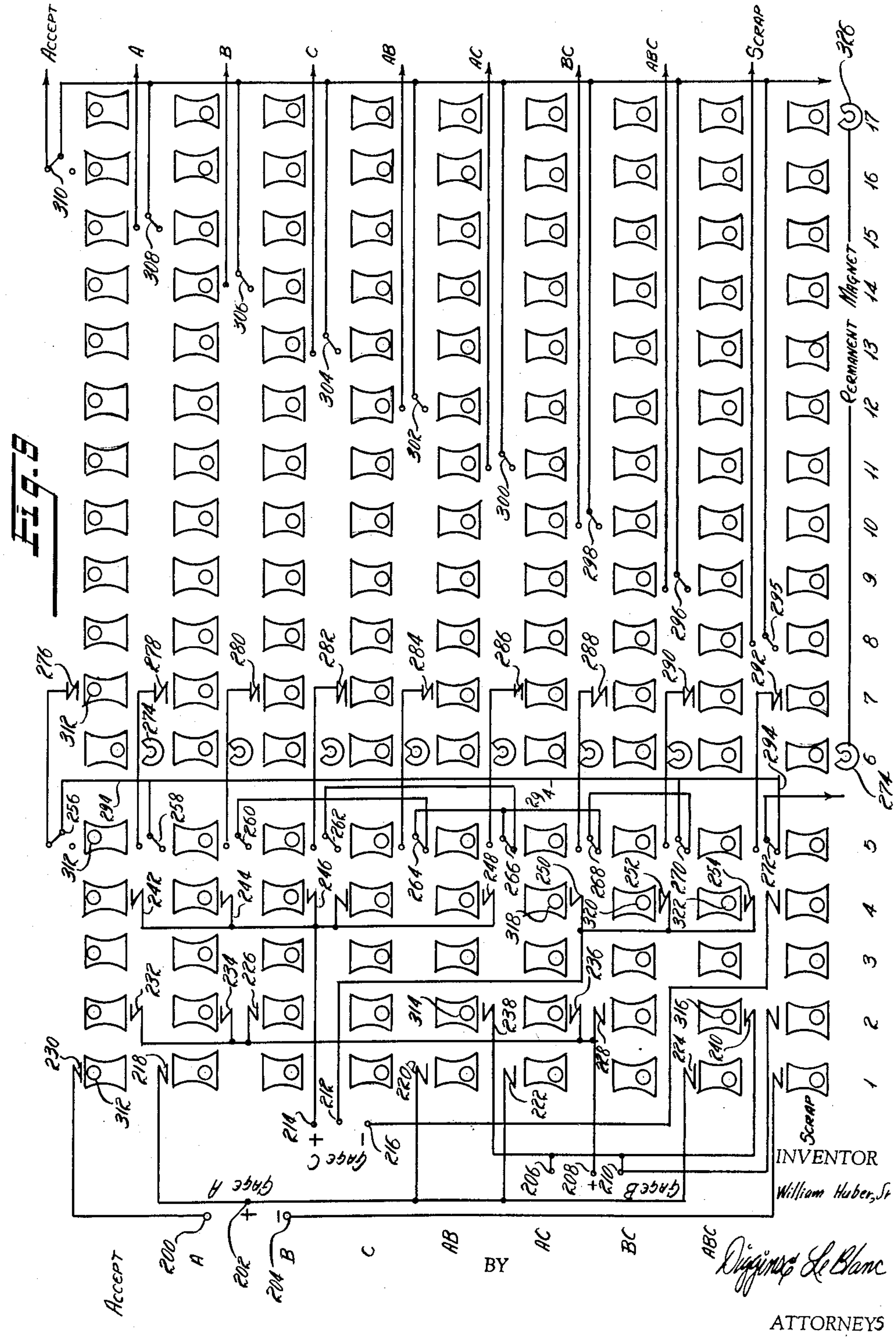
Figure 9 is a diagrammatic representation of the adaptation of the memory device of the invention to a specific classifying and sorting problem.
Figure 10:
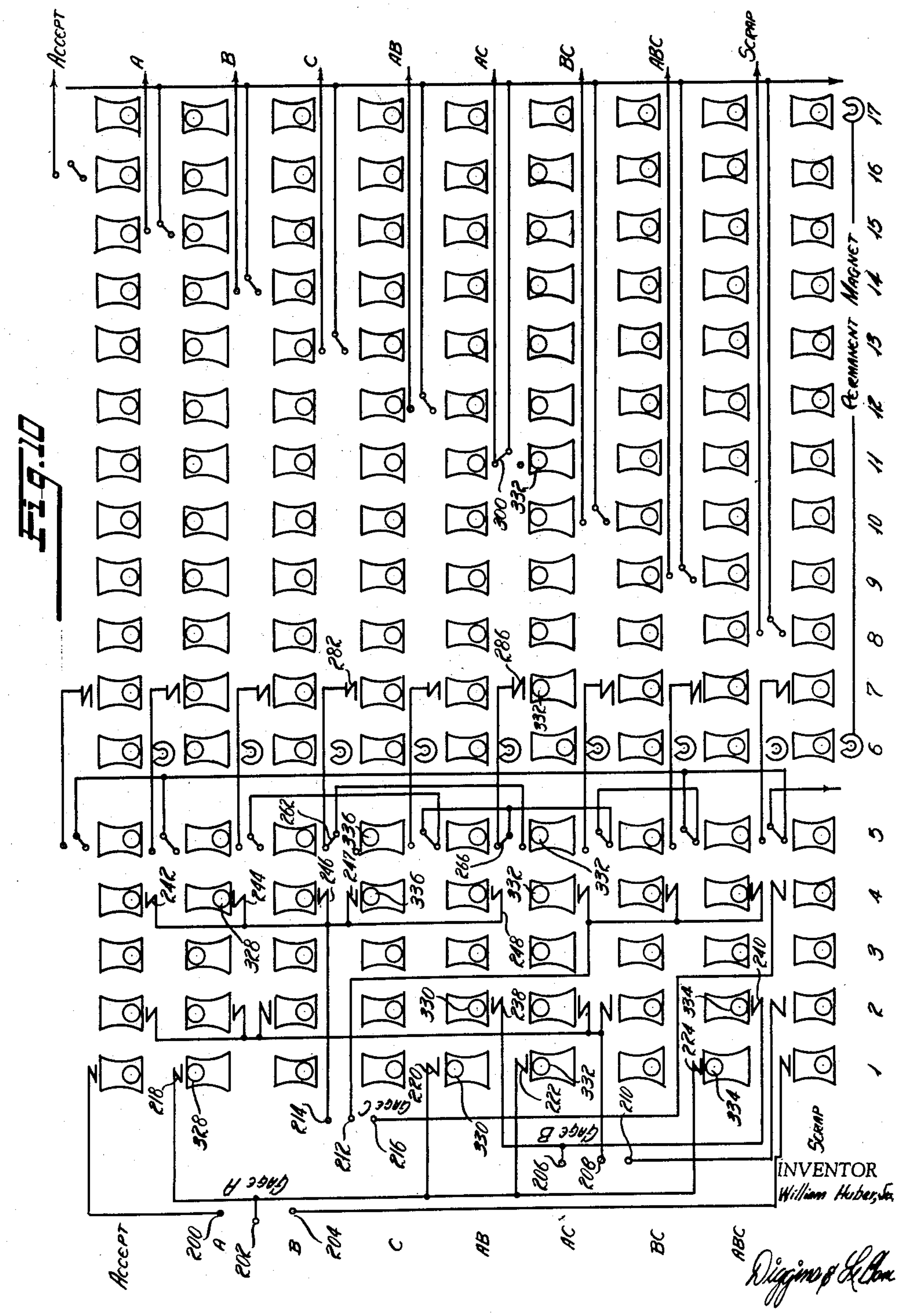
Figure 10 is a diagrammatic representation of the position of the switches in the memory device of Figure 9 during a particular sorting operation.

While the embodiment of the invention thus far described has utilized electromagnets only to attract the balls from the unslotted to the slotted ends of the barrels, or so to speak, "add" magnets, the invention also contemplates the use of electromagnets which are mounted upon the magnet support plates so as to be adjacent the unslotted ends of the barrel whereby they may "subtract" balls previously moved into the slotted end of the barrel by add magnets. When both add and subtract magnets are used the memory device may be applied to endless sorting and classifying problems and may sort pieces into a very large number of classes. An example of such a device is shown in Figures 9 and 10.

In this particular installation the memory device is set up to sort pieces or articles for three dimensions A, B, and C, wherein it is desired to reject or scrap all pieces which fall below tolerances, to accept all pieces which fall within tolerances, and to sort the remaining pieces as to the particular dimensions or combinations of dimensions which exceed tolerances. This requires the following sorts:

(1) Acceptable—those pieces whose three dimensions are within tolerance.

(2) Plus A—those pieces whose B and C dimensions are within tolerance but whose A dimension exceeds tolerance.

(3) Plus B—those pieces whose A and C dimensions are within tolerance but whose B dimension exceeds tolerance.

(4) Plus C—those pieces whose B and A dimensions are within tolerance but whose C dimension exceeds tolerance.

(5) Plus A and plus B—those pieces whose C dimension is within tolerance but whose A and B dimensions exceed tolerances.

(6) Plus A and plus C—those pieces whose B dimension is within tolerance but whose A and C dimensions exceed tolerances.

(7) Plus B and plus C—those pieces whose A dimension is within tolerance but whose B and C dimensions exceed tolerances.

(8) Plus A and plus B and plus C—those pieces wherein all three dimensions exceed tolerances.

(9) Scrap—those pieces having one or more dimensions which fall below tolerance.

Such a sorting operation might for example be applied to tubes having three dimensions, wherein the outside diameter represents the A dimension, the inside diameter represents the B dimension and the length of the tube represents the C dimension. It may be desirable to sort tuch tubes to accept those whose three dimensions are within tolerances and to reject those who have any one dimension which makes the tube contain too small an amount of material, such as an undersized outside diameter, an oversize inside diameter, or a short length. In such circumstances it is posible to remachine pieces which contain an excess of material, but it is necessary to scrap those pieces which already are too small.

In setting up the memory device to perform this type of sorting function it is necessary to utilize as many discs as there are classes or sorts into which the pieces are to be sorted. In the case of a three variable sort, as A, B, C, wherein sorting into all combinations of the variables is desired, nine discs are needed. (Acceptable, A, B, C, AB, AC, BC, ABC, and Scrap.) The number of barrels in the disc, or the number of stations, must be equal to the number of variables, plus a sensing station, plus a clearing station, plus a setting station, plus a number of eject stations equal to the number of classes into which the pieces are to be divided, plus a final clearing station; or in other words, three stations plus the number of variables, plus the number of classes into which the pieces are to be sorted. These stations can be broken down into four groups; the gaging stations, the clear and set stations, the eject stations and the final clearing station. In the particular sorting problem illustrated in the drawings this necessitates 16 stations but, since the measurement of the tube length in this particular problem requires a space of two stations, there is an additional unused station shown in the drawing.

Thus referring to Figure 9 there is shown a development of the positions of the barrels in nine discs called the "accept," A, B, C, AB, AC, BC, ABC and "scrap" discs respectively. Each disc is provided with seventeen barrel stations numbered 1 through 17, although station 3 is unused in this particular application of the memory device. Suitable gages are provided for measuring each of the dimensions A, B, and C and each of these gages is capable of producing an "accept" signal if the particular dimension being measured is within tolerances, a "plus" signal if the dimension being measured exceeds tolerance, and a "minus" signal if the dimension being measured falls below tolerance. These gages are shown in the drawing as "Gage A," "Gage B," and "Gage C." Gage A provides an "accept" signal at terminal 200, provides a "plus" signal at terminal 202, and provides a "minus" signal at terminal 204. Gage B provides an "accept" signal at terminal 206, a "plus" signal at terminal 208, and a "minus" signal at terminal 210. Gage C provides an "accept" signal at terminal 212, a "plus" signal at terminal 214 and a "minus" signal at terminal 216.

The connections for the add and subtract magnets associated with the disc depend upon the sequence of gaging. In the particular A, B, C, sequence assumed in this embodiment of the invention, the "plus" signal from terminal 202 of the A gage must be connected to the first station add magnet for each disc corresponding to a class wherein A exceeds tolerance; discs A, AB, AC, and ABC, in this instance. Thus terminal 202 is connected to add magnets 218, 220, 222 and 224. The terminal 208 for the "plus" signal from the B gage must be connected at station 2 to the add magnet of each disc corresponding to a class wherein B exceeds tolerance, with the exception of the add magnets at discs corresponding to those classes in which both A and B exceed tolerance; discs B and BC in this instance. Thus terminal 208 is connected to add magnets 226 and 228. The reason for the foregoing exception will be obvious since the "plus" signal for the A variable has already attracted these balls.

Terminal 214 carrying the "plus" signal from the gage for the third dimension C must be connected at station 3 to the add magnet for each disc corresponding to a class wherein C exceeds tolerance, with the exception of the add magnets of those discs corresponding to classes in which C and any other variable or variables exceed tolerance; disc C in this instance.

The "accept" signal from terminal 200 of the A gage is connected to the station 1 add magnet 218 at the disc corresponding to the acceptable class, and the "minus" signals from terminals 204, 210 and 216 corresponding to gages A, B and C are connected to the add magnets of the disc corresponding to the reject or scrap class at stations 1, 2 and 4 respectively. No subtract magnets need be provided at station 1 since the final clearing magnets 326 have placed all of the balls in a subtract condition. Consequently terminal 202 which receives the "plus" signal of A gage has no subtract connection.

Considering now that the piece being sorted has passed the A gage and is at the B gage and, recalling that a "plus" signal at the A gage was applied to the add magnets at each disc corresponding to a class in which A exceeded tolerance, it will be seen that four add magnets 218, 220, 222, and 224 corresponding to classes A, AB, AC and ABC were energized. If now there is a "plus" signal from the B gage it is obvious that the particular piece cannot be classified in the "accept" class, nor can it be classified in classes A or AC. The "plus" signal from gage B must thus energize the station 2 subtract magnets 232, 234 and 236 which are associated with the "accept," A and AC discs.

The "accept" signal from the B gage need not be connected to an add magnet associated with the "accept" disc since, when a piece is acceptable, the ball in the "accept" disc is initially attracted to an "accept" condition by the signal from the A gage. Since, however, an "accept" signal from gage B indicates that the piece cannot be sorted into classes AB or ABC, it is necessary that this signal be connected to the station 2 subtract magnets 238 and 240 associated with the AB and ABC discs.

A "plus" signal from terminal 214 of gage C indicates that the particular piece cannot be classified in the "accept" class, nor into classes A, B, or AB. The "plus" signal from the C gage must thus be connected to the station 4 subtract magnets 242, 244, 246 and 248 at the "accept" A, B, and AB discs. The "accept" signal from terminal 212 of the C gage likewise need not be connected to an add magnet associated with the "accept" disc. However, inasmuch as an "accept" signal from the C gage indicates that the piece cannot be sorted into classes AC, BC or ABC, it is necessary that this signal be connected to station 4 subtract magnets 250, 252 and 254 associated with discs AC, BC and ABC. This completes the connections of the gages and magnets in the gaging section.

Inasmuch as there is no gage following the C gage, it is possible that the balls in discs C and AC, C and AB, or C and ABC may be simultaneously in the attracted position. In order to eliminate all but the correct class indication, the sensing, clearing and set stations are provided. The sensing stations at station 5 are provided with single pole double throw switches 256–272 which are actuated by the balls in the attracted positions. The clearing station shown at station 6 is provided with permanent magnets 274 which return all balls to the unattracted condition. The set stations at station 7 are provided with add magnets 276–292 at each disc and these magnets are respectively connected to the uppermost terminals of the switches 256–272.

Since the position of the balls in the "accept," A and ABC discs need never be changed subsequent to the C gage station, the movable arms of the sense station switches 256, 258 and 270 corresponding to these discs are connected to a common lead 294 which is connected to a source of power through the "scrap" disc switch 272. Thus, as long as the particular piece being gaged has not caused the attraction of the ball in the "scrap"

disc so as to raise the movable arm of "scrap" switch 272, the balls in the "accept," A and ABC discs will be in the same position after passing through the sense, clear and set stations as they were before such passage.

Turning to the remaining switches 260, 262, 264, 266 and 268, it will be seen that if the ball in the B disc has been attracted it should remain attracted after passing through the clear station only if none of the balls in the remaining discs C, AB, AC, BC, and ABC, and "reject" have been attracted. The movable arm of switch 260 is thus connected to the lower terminal of switch 264. Since attraction of the C ball simultaneously energizes the subtract magnet 246 associated with the B disc, the B ball cannot be in an attracted position subsequent to attraction of the C ball, and consequently energization of switch 260 need not depend upon the condition of the ball in the C disc. The movable arm of switch 260 is thus connected to the lowermost contact on switch 264.

Similarly, if the ball in the AB disc has been attracted prior to attraction of the ball in the C disc, the subtract magnet 248 is simultaneouly energized so that the position of the C ball subsequent to the clear station need not be dependent upon the position of the switch 264 associated with the AB disc. The movable arm of switch 262 is thus connected to the lowermost contact of switch 266 corresponding to the AC disc. In like manner the position of the ball in the AB disc subsequent to passing through the clear station is not conditioned upon the position of the ball in the AC disc, whereas both the balls in the AB and AC discs are dependent upon the position of the ball in the BC disc. The movable arms of switches 264 and 266 are thus connected to the lowermost contact of switch 268 corresponding to the BC disc.

The sorting device shown in Figure 9 is provided with a series of conventional ejecting mechanisms for physically ejecting the article being sorted from the conveyor to the classifying bins and these ejectors are controlled by a series of switches 295–310 which are actuated by the balls when the latter are in an attracted position.

The operation of this classifier for a series of different dimensioned pieces is as follows. Considering first the simplest situation wherein the piece being gaged and classified is acceptable, as is illustrated in Figure 7; as the piece passes the A gage that gage indicates that it is within tolerance and supplies a signal to the "accept" terminal 200 which causes energization of add magnet 230 at station 1 of the "accept" disc. This attracts the ball 312 which is at station 1 at the time. The piece next passes under the B gage at station 2 and the "accept" signal from that gage is applied to terminal 206 and to the subtract magnets 238 and 240 associated with the AB and ABC discs at station 2. Since the balls 314 and 316 at these stations are already in a subtract position the energization of these magnets has no effect. The piece next proceeds to the C gage at station 4 and an "accept" signal from that gage is impressed upon terminal 212 and subtract magnets 250, 252 and 254 associated with the AC, BC and ABC discs at station 4. Since the balls 318, 320 and 322 in these discs are already in a subtract condition the energization of these magnets has no effect. The discs then rotate to place the barrels under consideration at station 5. Ball 312 in the "accept" disc is in the add position and thus moves the movable arm of switch 256 upward. The balls in all of the remaining discs are in a subtract position so that the movable arms of the remaining switches 258–272 remain in their lowermost position. The raising of the movable arm of switch 256 closes a circuit to the add magnet 276 at the set station 7 through switch 256, line 294 and switch 272. Energization of add magnet 276 attracts ball 324 which is at station 7 in the "accept" disc. All balls at station 6 are returned to an unattracted or subtract position by means of the permanent magnets 274. The ball 312 then proceeds serially through stations 8–17 and at station 16 actuates switch 310 to energize an ejector mechanism at station 16 which ejects the piece into the "accept" bin or chute. At station 17 all balls are returned to the unattracted or subtract position by means of permanent magnets 326.

Considering now the situation wherein a piece exceeds tolerance in two dimensions, as for example dimensions A and C, the operation of the sorting device is shown in Figure 10. As the piece passes under the A gage a plus signal is delivered to terminal 202 and from there to station 1 add magnets 218, 220, 222 and 224 to attract balls 328, 330, 332 and 334 in discs A, AB, AC and ABC. The piece then proceeds to the B gage which delivers an "accept" signal to terminal 206 to energize station 2 subtract magnets 238 and 240 which are associated with discs AB and ABC. This causes the subtraction of balls 330 and 334. The piece then proceeds to the C gage which delivers a plus signal to terminal 214 and this causes energization of station 4 subtract magnets 242, 244, 246 and 248 associated with disc A, B, and AB. Energization of magnets 246 and 248 has no effect upon the balls in discs B and AB, since they are already in an unattracted or subtract condition, but energization of subtract magnet 244 causes subtraction of ball 328 in disc A. Energization of add magnet 247 causes the attraction of ball 336 in disc C, so that at station 4 balls 336 in disc C and 332 in disc AC are in the add or attracted positions. The piece then proceeds onward from gage C and the discs rotate to position 5 where attracted balls 336 and 332 actuate switches 262 and 266. Actuation of switch 266 supplies current to add magnet 286 at station 7 of disc AC, but no current is supplied to add magnet 282 at station 7 of disc C since the supply circuit to that magnet is broken at switch 266. The piece continues along the conveyor and the discs continue to rotate until ball 332 in disc AC arrives at station 11 whereupon it actuates switch 300 to cause ejection of the piece into the AC bin or chute.

Another application of the device of the invention may use a gaging mechanism which determines in one operation which of a group of tolerances an object measured falls, such as follows:

1. 000}
1. 001} Size A
1. 001}
1. 002} Size B
1. 002}
1. 003} Size C etc. to any number of groups.

By connecting size A gage to an electromagnet at position 9, Figure 7, size A is ejected at position 10, Figure 7, by switch 170. Using another plate, size B gage is connected to magnet at position 8 and is ejected two stations later by a switch mounted on the same shaft as switch 170. Using still another plate, size C gage is connected to electromagnet at position 7 and is ejected three stations later by a switch mounted on the same shaft.

Thus by using a plate for every size range and connecting the various sizes from the gage to the next succeeding electromagnet, up to size J or the tenth size could be operated from a switch located on the same shaft as switch 170. Sizes K, L, M, would have to use switches mounted on the same shaft as switch 176. Thus, with a 15 barrel plate and 13 plates, 13 different sizes could be sorted.

The above method known as selective sorting is used quite extensively in the auto industry, bearing industry or wherever male parts are fitted to female parts. When sorting is done in this manner, similar parts are grouped into size classifications and then fitted together which in turn greatly reduces the accuracy requirements of the production machines.

The operation of the device to eject pieces falling into the other classifications will be apparent to those skilled in the art from the foregoing description.

The memory device may be adapted to innumerable classifying and sorting problems and may handle any number of variables depending only upon the number of discs and stations provided. Changeover from one job to another may be made by the simple addition or subtraction of discs and the rearrangement of the magnets. Operation is reliable and there is no danger that wear will introduce errors in classification.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A magnetic memory device comprising a mounting means defining a series of containers therein mounted for movement which carries said containers through a closed path of movement, a magnetic member movably mounted in each container, an electromagnet mounted adjacent the path of movement of said containers to cause a magnetic member in a container adjacent said electromagnet to move from one portion of said container to another portion of said container when said electromagnet is energized, means for sensing the position of said magnetic members in said containers, and a magnet mounted adjacent the path of movement of said containers to cause the magnetic members in all containers passing thereby to assume the position from which they are removed by said electromagnet.

2. A magnetic memory device comprising a plurality of mounting means each defining a series of containers mounted therein, each of said mounting means being mounted for movement which carries its associated containers through a closed path of movement, a magnetic member movably mounted in each container, at least one electromagnet mounted adjacent the path of movement of each of said series of containers to cause a magnetic member in containers adjacent said electromagnets to move from one portion of said containers to another portion of said containers when said electromagnets are energized, means for sensing the position of said magnetic members in said containers, and magnetic means for returning magnetic members moved by said electromagnets to their original positions.

3. A magnetic memory device as set out in claim 2 including additional electromagnets associated with said containers for returning to their original positions magnetic members moved by said first mentioned electromagnets.

4. A magnetic memory device as set out in claim 2 wherein said sensing means comprises a member associated with each series of containers for contacting those magnetic members therein which have been moved by said electromagnets.

5. A magnetic memory device as set out in claim 4 wherein said contacting members contact such magnetic members in a manner to mechanically urge them towards that portion of said containers into which they have been moved by said electromagnets.

6. A magnetic memory device as set out in claim 5 wherein said containers are generally cylindrical and said magnetic members are spherical.

7. A magnetic memory device as set out in claim 6 wherein said containers move in circular paths.

8. A magnetic memory device comprising a member mounted for rotation and defining a series of generally cylindrical barrels at its periphery, a spherical magnetic member movably mounted in each barrel, each barrel having an axial length at least double the diameter of said spherical member, said spherical members being free to move from one end of said barrels to the other, an electromagnet mounted adjacent the path of movement of one end of said barrels to cause a spherical member in a barrel adjacent said electromagnet to move from the far end of said barrel to the end adjacent said electromagnet when said electromagnet is energized, sensing means adjacent the path of movement of said barrels for contacting spherical members which have been moved by said electromagnet, and magnetic means adjacent the path of movement of said barrels for returning to their original positions spherical members which have been moved by said electromagnets.

9. A magnetic memory device as set out in claim 8 wherein the axes of said barrels are parallel and are parallel to the axis of rotation of said rotatable member.

10. A magnetic memory device as set out in claim 9 wherein said barrels have cylindrical end portions separated by a constricted central portion, the diameter of said central portion being greater than the diameter of said spherical members.

11. A magnetic memory device as set out in claim 10 wherein an aperture is provided in each barrel between said constricted portion and one end thereof and said sensing means extends into said aperture.

12. A magnetic memory device as set out in claim 11 wherein said sensing means is spaced from said end of said barrel by a distance which exceeds the radius of the spherical member therein.

13. A magnetic memory device as set out in claim 12 wherein said sensing means is moved upon contacting a spherical member and this movement actuates a switch.

14. A magnetic memory device comprising a plurality of members mounted upon a shaft for rotation, each of said members defining a series of generally cylindrical barrels at its periphery, a spherical magnetic member movably mounted in each barrel, each barrel having an axial length at least double the diameter of said spherical member, said spherical members being free to move from one end of said barrels to the other, at least one electromagnet mounted adjacent the path of movement of one end of each of said series of barrels to cause spherical members in barrels adjacent said electromagnets to move from the far ends of said barrels to the ends adjacent said electromagnets when said electromagnets are energized, sensing means adjacent the paths of movement of each series of said barrels for contacting spherical members which have been moved by said electromagnets, and magnetic means adjacent the paths of movement of each of said series of barrels for returning to their original positions spherical members which have been moved by said electromagnets.

15. A magnetic memory device as set out in claim 14 wherein the axes of said barrels are parallel and are parallel to said shaft.

16. A magnetic memory device as set out in claim 15 wherein said barrels have cylindrical end portions separated by a constricted central portion, the diameter of said central portion being greater than the diameter of said spherical members.

17. A magnetic memory device as set out in claim 16 wherein an aperture is provided in each barrel between said constricted portion and one end thereof and said sensing means extends into said aperture.

18. A magnetic memory device as set out in claim 17 wherein said sensing means is spaced from said end of said barrel by a distance which exceeds the radius of the spherical member therein.

19. A magnetic memory device as set out in claim 14 including additional electromagnets associated with at least some of said members, said electromagnets being mounted adjacent the path of movement of the other ends of said barrels to cause spherical members moved by said first electromagnets to be returned to their original positions when said last mentioned electromagnets are energized.

20. A magnetic memory device comprising a mounting means defining a series of containers closed at both ends and mounted for movement which carries said containers through a closed path of movement, a spherical magnetic member mounted in each container, each said container being shaped so that the magnetic member therein assumes either of two stable positions separated by an intermediate unstable position, an electromagnet mounted adjacent the path of movement of said containers to cause a magnetic member in a container adjacent said electromagnet to move from one stable position therein through said intermediate unstable position to the other stable position when said electromagnet is energized, and means for sensing the position of said magnetic members in said containers.

21. A magnetic memory device as set out in claim 20 wherein said containers are generally cylindrical in shape and have a reduced diameter portion between the ends thereof.

22. A magnetic memory device as set out in claim 21 wherein said containers are moved in a circular path about an axis and the cylindrical axes of said containers are parallel to said axis.

23. A magnetic memory device comprising a plate mounted on a shaft for rotation, a series of generally cylindrical containers closed at both ends and mounted about the periphery of said plate with the axes of said containers parallel to said shaft, a magnetic member contained in each container and movable from a first stable position at one end thereof to a second stable position at the other end thereof separated by an intermediate unstable position, an electromagnet mounted adjacent the path of movement of said containers to cause a magnetic member in a container adjacent said electromagnet to move from one stable position at one end of said container through said intermediate unstable position to the other stable position at the other end of said container when said electromagnet is energized, means for sensing the position of said magnetic members in said containers and means adjacent the path of movement of said containers to cause the magnetic members in all containers passing thereby to return to the end of the container from which they were removed by said electromagnet.

24. A magnetic memory device as set out in claim 23 wherein said electromagnet is on one side of said plate and said last named means is on the other side and said magnetic members move from one side of said plate to the other in said containers.

25. A magnetic memory device comprising a shaft mounted for rotation in a frame means, a plurality of discs on said shaft, each said disc carrying a plurality of containers closed at both ends, a magnetic member movably mounted in each container and movable into two stable positions separated by an intermediate unstable position, a plurality of plates associated with said discs, said plates being removably mountable in said frame means adjacent said discs, electromagnets on said plates in said frame means, said electromagnets moving the magnetic members in adjacent containers from one of said stable positions through said intermediate unstable position into the other stable position when energized, said plates being movable in a rotational manner about said shaft to circumferentially position said electromagnets, and means carried by said frame means for sensing the position of said magnetic members in said containers.

26. A magnetic memory device as set out in claim 25 wherein said frame means includes a plurality of parallel mounting bars which receive said plates.

References Cited in the file of this patent

UNITED STATES PATENTS

| | | |
|---|---|---|
| 2,208,164 | Sage | July 16, 1940 |
| 2,474,074 | Sunstein | June 21, 1949 |
| 2,477,395 | Sunstein | July 26, 1949 |

FOREIGN PATENTS

| | | |
|---|---|---|
| 480,135 | Great Britain | Feb. 17, 1938 |